June 4, 1935.  W. L. KRAMER  2,003,751
FOOT ACCELERATOR PEDAL
Filed July 26, 1934
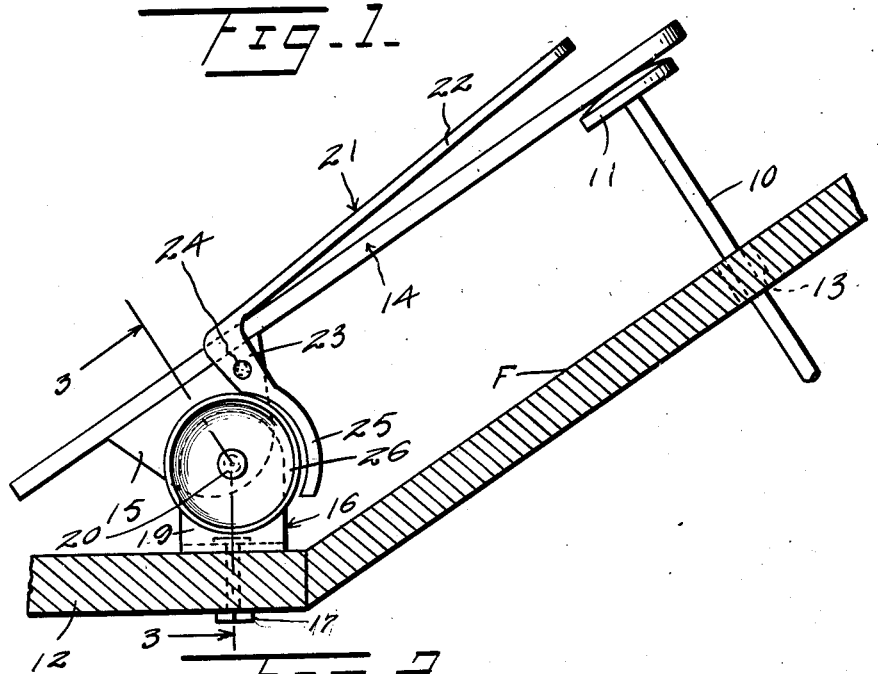
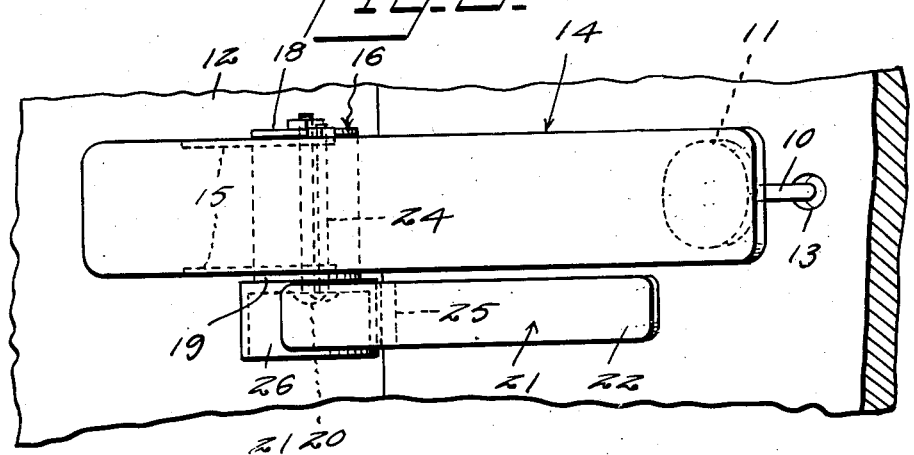
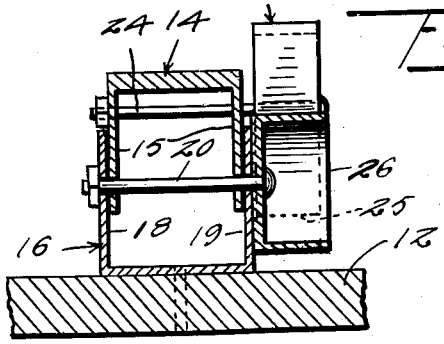
Inventor
W. L. Kramer
By Watson E. Coleman
Attorney Patented June 4, 1935

2,003,751

UNITED STATES PATENT OFFICE 2,003,751

FOOT ACCELERATOR PEDAL

William L. Kramer, Houston, Tex.

Application July 26, 1934, Serial No. 737,119

4 Claims. (Cl. 74—513)

This invention relates to accelerator operating pedals and more particularly to an improved type of pedal to be operated by the foot whereby the pedal may at will be locked in any desired position.

An object of this invention is to provide an improved type of accelerator pedal whereby the chattering or sudden rocking of the pedal is prevented where the vehicle is moving over bumpy roads or the like.

Another object of this invention is to provide an improved type of pedal structure which is so constructed that the operator of the vehicle can rest his foot on the pedal without applying any pressure to the pedal and at the same time maintain the pedal in a depressed position so as to operate the vehicle at a fairly steady speed.

A further object of this invention is to provide in a pedal of this kind, means to lock the pedal in the desired depressed position by a very slight pressure of the foot, which pressure upon release, will permit the free operation of the pedal.

A still further object of this invention is to provide a pedal structure of this kind whereby the pedal may be operated independent of the locking means but may at will be locked by a slight movement of the foot so that it will not be necessary to tire the muscles of the foot in order to hold the pedal depressed as is the case where a vehicle is travelling at a fairly rapid rate for relatively long distances.

The above and various other objects and advantages of this invention will in part be described and in part be understood from the following detailed description of the present preferred embodiment, the same being illustrated in the accompanying drawing wherein:—

Figure 1 is a detail side elevation of a device constructed according to the preferred embodiment of this invention, mounted on the floorboard of a vehicle, the floorboard being shown in fragmentary sectional form.

Figure 2 is a top plan view of the device.

Figure 3 is a sectional view taken on the line 3—3 of Figure 1.

Referring to the drawing wherein like numerals of reference designate corresponding parts throughout the several views, the letter F designates generally the floor of a motor vehicle of suitable construction through which the stem portion 10 of an accelerator extends. The accelerator rod 10 has a head 11 thereon and the stem 10 extends through an opening 13 in the inclined portion of the floor F. This construction is conventional and is here shown as only one type of accelerator construction and vehicle floor with which the hereinafter described invention may be combined.

An accelerator or foot pedal is mounted on the horizontal portion 12 of the floor F and this pedal comprises a foot plate or rock lever 14 provided with dependent lugs or flanges 15. A substantially U-shaped bracket or mounting 16 is secured to the floor portion 12 as by a bolt or attaching means 17. The vertical legs 18 and 19 of the bracket or mounting 16 engage on opposite sides of the dependent lugs or flanges 15, and a bolt or shaft 20 extends through the vertical legs 18 and 19 and the dependent lugs 15, so as to rockably mount the plate or lever 14 on the floor of the vehicle.

In order to provide a means whereby the accelerator pedal or lever 14 may be releasably locked in any desired depressed position, I have provided a locking lever, generally designated as 21. This locking lever 21 comprises an elongated arm 22 provided with an angularly related rear or lower extension 23 which is pivotally mounted as by a pivot 24 on the pedal structure 14.

In the present instance, the locking lever 21 is mounted on the right side of the pedal 14, but I do not wish to be limited to this particular position as, if desired, the locking lever 21 can be mounted on either the right or left side or in the middle of the pedal 14. The dependent extension 23 of the arm 22 has a segmental braking portion 25 which is disposed closely adjacent a braking drum 26, which is fixed to the vertical leg 19 of the supporting bracket 16.

In the use and operation of the pedal structure hereinbefore described, in the normal operation of the accelerator member 10, the pedal 14 can be rocked to depressed position and the usual spring returning the rod 10 to idling position will also raise the pedal 14 to inoperative position. Where a person is operating the vehicle for a considerable distance and at a fairly rapid rate of speed or over relatively rough or ripply roads, and it is desired to relieve the pressure of the foot on the pedal 14, when the pedal 14 has been depressed to the desired position, the foot at one side is raised slightly and then moved laterally of the pedal 14 so as to engage over the locking lever 21. This movement is effected without raising the pedal 14, and when the foot engages the arm 22 of the lever 21, this arm 22 is depressed and the braking segment 25 will frictionally engage the fixed braking drum 26. If desired, a conventional type of braking fabric may be secured to the inner face of the segment 25 so as to prevent rocking of the pedal 14 when this segment frictionally engages the drum 26.

It will be apparent from the foregoing that only a relatively light pressure need be applied to the arm 22 in order to maintain the braking segment 25 in frictional contact with the drum 26 and in this manner, the pedal 14 will be releasably held against rocking movement in either direction. In order to release the locking lever 21, it is only necessary to move the foot laterally thereof or in the direction of the pedal 14 whereupon the pedal 14 may be depressed or permitted to be raised under the action of the accelerator spring attached to the accelerator rod structure 10.

What is claimed is:—

1. In combination, an accelerator pedal, means for rockably mounting said pedal on a vehicle floor, a fixed braking member carried by said mounting means, and a releasable braking member disposed at one side of and rockably secured to said pedal for engagement with said fixed braking member to releasably hold the pedal in a selected depressed position.

2. As a new article of manufacture, a pedal member, means for rockably mounting said pedal member on the floor of a vehicle for contact with the accelerator of the vehicle, an annular braking member fixed to said mounting means, and a releasable locking member rockably carried by said pedal at one side thereof and in a direction parallel with the pedal for engagement with said fixed braking member to releasably hold the pedal in a selected depressed position.

3. As a new article of manufacture, a pedal member, means for rockably mounting said pedal member in a position for engagement with the accelerator rod of a vehicle, an annular braking member fixed to said mounting means, a rock lever pivotally secured in parrallel relation to one side of said pedal, and means carried by said rock lever for engagement with said braking member upon rocking of the lever to releasably hold the pedal in a selected depressed position.

4. As a new article of manufacture, a pedal for the foot accelerator of a motor vehicle, said pedal comprising a relatively flat plate, dependent lugs carried by said plate adjacent the rear end thereof, a bracket adapted to be secured to the floor of the vehicle and engaging on each side of said lugs, a shaft extending through the bracket and the lugs to rockably mount the plate on the bracket, a fixed braking member secured to the bracket, a rock lever, means engaging the lever and at least one of the dependent lugs to rockably mount the lever on the pedal, and a segmental braking member carried by said lever for engagement with said braking member to hold the pedal in a selected depressed position.

WILLIAM L. KRAMER.